(12) United States Patent
Shimizu

(10) Patent No.: US 6,234,730 B1
(45) Date of Patent: *May 22, 2001

(54) THERMAL CHANGE COMPUTATION APPARATUS FOR MACHINE TOOL

(75) Inventor: Kimihiro Shimizu, Toyoake (JP)

(73) Assignee: Brother Industries, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,673

(22) Filed: Sep. 30, 1999

(30) Foreign Application Priority Data

Oct. 30, 1998 (JP) .................................................. 10-310706

(51) Int. Cl.$^7$ .............................. B23C 9/00; B23Q 15/18; G01K 5/00

(52) U.S. Cl. ........................ 409/131; 409/135; 700/159; 700/173

(58) Field of Search .................................... 409/135, 136, 409/80, 131, 132, 79; 700/193, 159; 318/603; 82/1.11, 900

(56) References Cited

U.S. PATENT DOCUMENTS

| | | | |
|---|---|---|---|
| 4,628,441 | * 12/1986 | Johnstone et al. | 700/193 |
| 5,375,066 | * 12/1994 | Yee et al. | 700/193 |
| 5,623,857 | * 4/1997 | Sakuraba | 409/135 X |
| 5,740,081 | * 4/1998 | Suzuki | 700/159 X |
| 5,779,405 | * 7/1998 | Aiso et al. | 409/132 |
| 5,833,407 | * 11/1998 | Senda | 409/131 |
| 6,000,889 | * 12/1999 | Shimizu | 409/80 X |

FOREIGN PATENT DOCUMENTS

| | | | |
|---|---|---|---|
| 132441 | * 8/1983 | (JP) | 409/135 |
| 62-88548 | 4/1987 | (JP) . | |
| 10-143217 | 5/1998 | (JP) . | |

* cited by examiner

Primary Examiner—William Briggs
(74) Attorney, Agent, or Firm—Oliff & Berridge, PLC (57) ABSTRACT

A thermal change computation apparatus is used with a machine tool that includes a machining mechanism for machining a workpiece and a driving mechanism for changing a relative position between the machining mechanism and the workpiece. The apparatus comprises a driving state detecting unit for detecting a driving state of a machine tool to be used; a holding time computing unit for computing a holding time where a thermal change substantially remains; a change amount computing unit for computing a thermal change amount of the machine tool based on the driving state detected at every designated operation; and a change amount adding unit for computing a present thermal change amount of the machine tool by adding an influence of a thermal change amount computed previously to a thermal change amount computed newly when the previously computed thermal change amount is available and the holding time inherent in the machine tool does not elapse since the change amount computing unit computes. The holding time computing unit computes a holding time inherent in a machine tool to be used, and accurate thermal change amount is computed using the computed holding time.

21 Claims, 11 Drawing Sheets

| MACHINE TOOL | HOLDING TIME [HOUR(S)] |
|---|---|
| A | 2 |
| B | 1 |
| C | 3 |
| ⋮ | ⋮ |

THERMAL CHANGE COMPUTATION APPARATUS FOR MACHINE TOOL

CROSS-REFERENCE TO RELATED APPLICATION

This application is related to U.S. patent application Ser. No. 09/126,417, filed on Jul. 30, 1998, now U.S. Pat. No. 6,000,889, which is incorporated by reference in its entirety.

BACKGROUND OF THE INVENTION

1. Field of Invention

The invention relates to a thermal change computation apparatus for use with a machine tool, for computing amount of thermal change that is generated on the machine tool.

2. Description of Related Art

Machine tools include generally a machining mechanism for cutting or drilling a workpiece and assembling product component parts on a base plate, and a driving mechanism for changing a relative position between the machining mechanism and a workpiece. In general, machine tools for cutting a workpiece or the like include a holding mechanism for holding tools such as drills and taps, a main driving mechanism for rotating tools held on the holding mechanism, an X-axis feed mechanism for feeding tools in the X-axis direction, a Y-axis feed mechanism for feeding tools in the Y-axis direction, a Z-axis feed mechanism for feeding tools in the Z-axis direction, and an electronic control apparatus for controlling these feed mechanisms.

Figure 13:
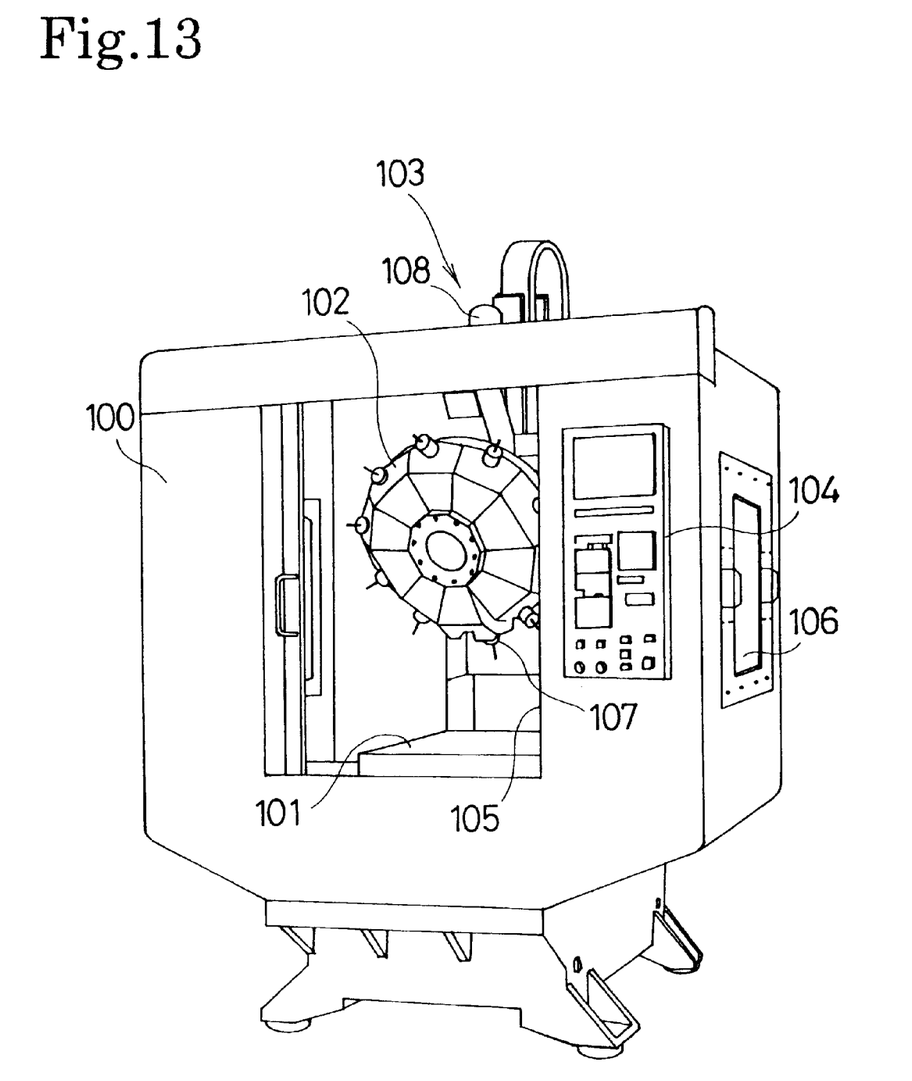
FIG. 13 is a perspective view of a machine tool in the previous example and the embodiments.

For example, as shown in FIG. 13, a machine tool is covered with a splash guard 100 for preventing cut wastes from splashing. In the inside of the splash guard 100, there are disposed a table 101 for holding a workpiece (not shown), an automatic tool change (ATC) magazine 102 for changing tools, such as drills and taps, and a machine tool body 103. The splash guard 100 provides a control panel 104, a work change opening 105 for loading or ejecting a workpiece and an inspection hatch 106 used mainly for maintenance.

Figure 14:
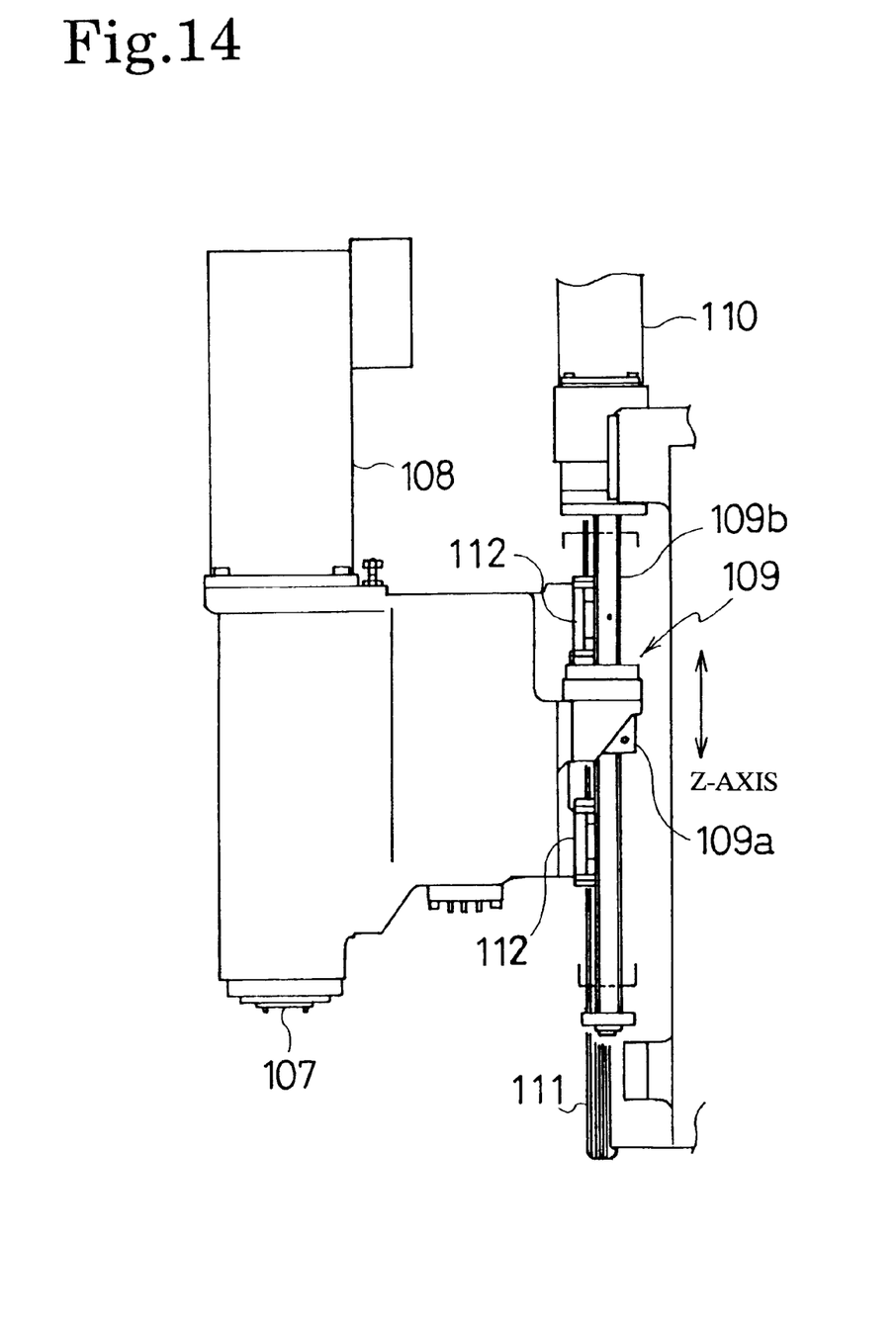
FIG. 14 is a sectional view of a main shaft control system and a Z-axis control system of the machine tool indicated in FIG. 13.

As shown in FIG. 14, the body 103 includes a main shaft 107 for holding tools such as drills and taps, a main shaft motor 108 for rotating the main shaft 107, a ball thread mechanism 109 which comprises a nut 109a housing a number of steel balls and which is fixed to the main shaft side and a ball thread 109b inserted into and engaged with the nut 109a, a Z-axis motor 110 for rotating the ball thread 109b, a guide rail 111 disposed in parallel with the ball thread 109b, a slide 112 for coupling the guide rail 40 and the main shaft 28 (not shown).

In this body 103, the ball thread mechanism 109 and the Z-axis motor 110 constitute the Z-axis feed mechanism for feeding the main shaft 107 in the Z-axis direction. When the Z-axis motor 110 rotates the ball thread 109b, the main shaft 107 is moved in the Z-axis direction. Moreover, the table 101 may be moved in the X-axis direction and Y-axis direction. As the main shaft 107 may be moved in the Z-axis direction, relative positions among a workpiece and tools in the X-axis, Y-axis and Z-axis directions may be changed.

In this type of machine tool, as the ball thread mechanism 109 is operated, a frictional heat is generated and the ball thread 109b expands. Also in other mechanisms, a thermal change occurs due to the heat thus generated. When such thermal change occurs in the Z-axis direction, for example, an error occurs in a depth of flute and a height of stepped portion formed on a workpiece. If a dimensional tolerance of the workpiece is sufficiently larger than a thermal change amount, then a machining error caused by such thermal change is negligible. If not, such a thermal change should be corrected.

Therefore, there is provided a thermal change computation apparatus for computing a thermal change amount of a machine tool in Japanese laid-open Patent Publication No. 62-88548. In this computation apparatus, when a drive mechanism is controlled in accordance with a predetermined work program, a machining error is corrected in response to the computed thermal change amount.

However, in this machine tool thermal change computation apparatus, since the thermal change amount is continuously computed while the machine tool is operated, a system for executing such computation processing should be operated constantly as well, resulting in an increase in the computation processing load.

In view of the fact that a heat generated amount and a heat radiated amount are placed in the equilibrium state as the temperature rises while a machine tool is continuously operated, a method of computing a thermal change amount was proposed in Japanese laid-open Patent Publication No. 10-143217.

That is, during a period in which the machine tool is operated, a thermal change amount at each timing point is computed based on a saturated thermal change amount (thermal change amount in the equilibrium state) and a machine tool driving time. When the computed thermal change amount becomes nearly equal to the saturated thermal change amount, the value of the saturated thermal change amount will be used as the thermal change amount. In this case, if an accurate saturated thermal change amount is given, a thermal change amount at each timing point may be computed, thus reducing a computation processing load.

However, in the above thermal change computation apparatus, a saturated thermal change amount is fixed. When the machine tool operating program, which includes a step for driving a machine tool at a high speed and a step for driving a machine tool at a low speed, is executed in the apparatus, the thermal change amount computation accuracy is slightly lowered. Since the saturated thermal change amount is fixed relative to an average driving speed, it is unavoidable that the above computation method computes the thermal change amount as a smaller thermal change amount in the step of driving a machine tool at a high speed, and computes the thermal change amount as a larger thermal change amount in the step of driving a machine tool at a low speed.

SUMMARY OF THE INVENTION

The invention proposes a thermal change computation apparatus that can compute an accurate thermal change amount in accordance with a driving state at every moment of the operation of a machine tool. In the machine tool, an increase-decrease characteristic of the thermal change amount generated in the driving mechanism of the machine tool, a characteristic of a saturated thermal change amount in accordance with the driving condition of the driving method (a characteristic of the maximum thermal change amount), and a holding time where a thermal change substantially remains, are preset. Based on the preset characteristics, holding time and the state of the driving mechanism, the thermal change amount at every moment the driving mechanism operates, is computed in consideration of past thermal change amount, thus the thermal change amount is corrected.

In the case where a thermal change amount computation program common in a plurality of machine tools is installed on the machine tool, if an average holding time common in the machine tools is set, it is expected that problems will occurs, as set forth below.

For a small-sized machine tool, the influence of a thermal change amount disappears in a relatively short time, but a great deal of memory is needed for the thermal change amount computation because a longer holding time is set. On the other hand, for a large-sized machine tool, the influence of a thermal change amount remains relatively long, so that the thermal change amount computation accuracy is lowered because a shorter holding time is set.

Therefore, one aspect of the invention is to provide a thermal change computation apparatus that can set a holding time suitable for a machine tool to be used and compute an accurate thermal change amount at every driving state of the machine tool, a thermal change amount computation method, and a computer-readable memory medium that stores a thermal change amount computation programs.

The thermal change computation apparatus of the invention is to be used with a machine tool that includes a machining mechanism for machining a workpiece and a driving mechanism for changing a relative position between the machining mechanism and the workpiece. The thermal change computation apparatus comprises a driving state detecting unit for detecting a driving state of the machine tool; a holding time computing unit for computing a holding time where a thermal change substantially remains; a change amount computing unit for computing a thermal change amount of the machine tool based on the driving state detected at every designated operation; and a change amount adding unit for computing a present thermal change amount of the machine tool by adding the influence of a thermal change amount computed previously to a newly computed thermal change amount when the previously computed thermal change amount is available and the holding time inherent in the machine tool does not elapse.

Since the holding time computing unit computes a holding time inherent in the machine tool, it is possible to compute an accurate thermal change amount using the computed holding time.

In a preferred form of this embodiment, the holding time computing unit computes holding time t using the following formula:

$$t = -1/\gamma \cdot \ln\Delta$$

where $\gamma$ represents a value showing an increase-decrease characteristic of the thermal change amount that is inherent in the machine tool, and $\Delta$ a designated very small value. Therefore, it is possible to compute an accurate holding time.

A further embodiment of the invention is a computer-readable storage medium that stores a thermal change amount computation program for use with a machine tool including a machining mechanism for machining a workpiece and a driving mechanism for changing the relative position between the machining mechanism and the workpiece. The thermal change amount computation program includes a routine that detects a driving state of the machine tool; a routine that computes a holding time where a thermal change substantially remains; a routine that computes a thermal change amount of the machine tool based on the driving state of the machine tool detected at every predetermined operation; and a routine that computes a present thermal change amount of the machine tool by adding the influence of the thermal change amount computed previously to a newly computed thermal change amount when the previously computed thermal change amount is available, and the holding time inherent in the machine tool does not elapse.

Therefore, a holding time inherent in the machine tool can be computed on a computer that is connected to the machine tool, via the thermal change amount computation program stored in the computer-readable storage medium, such as a floppy disk and a CD-ROM. Accordingly, it is possible to compute an accurate thermal change amount using the holding time.

Another embodiment of the invention is a thermal change computation apparatus to be used in common with a plurality of machine tools each including a machining mechanism for machining a workpiece and a driving mechanism for changing the relative position between the machining mechanism and the workpiece. The thermal change computation apparatus comprises a driving state detecting unit for detecting a driving state of a machine tool to be used; a holding time memory for storing a holding time where an influence of a thermal change amount substantially remains and that is inherent in the machine tool; a change amount computing unit for computing a thermal change amount of the machine tool based on the driving state detected at every designated operation; and a change amount adding unit for computing a present thermal change amount of the machine tool by adding the influence of the previously computed thermal change amount to a newly computed thermal change amount when the previously computed thermal change amount is available, and the holding time inherent in the machine tool does not elapse.

According to the thermal change computation apparatus, the holding time memory stores a holding time inherent in the machine tool, and the change amount adding unit computes a present thermal change amount of the machine tool by adding the influence of the thermal change amount computed previously before the holding time elapses, to a newly computed thermal change amount, thus an accurate thermal change amount can be computed so as to match each of the individual machine tools.

In a preferred form of the invention, the apparatus further includes a holding time setting unit that sets a holding time inherent in a machine tool to be used, and the holding time storage unit that stores a holding time that is set by the holding time setting unit. Therefore, an operator can set a holding time inherent in a machine tool to be used and it is possible to compute an accurate thermal change amount for each type of machine tools.

In another preferred form of the invention, the holding time storage unit stores a holding time inherent in each of the machine tools that corresponds to the respective machine tools. Accordingly, it is possible to use a holding time inherent in a machine tool to be used and compute an accurate thermal change amount.

BRIEF DESCRIPTION OF THE DRAWINGS

The invention will be described in greater detail with reference to preferred embodiments thereof and the accompanying drawings wherein;

FIG. 6(a) is a line chart showing a behavior of a thermal change occurred from time 0 to time 1a;

FIG. 6(b) is a line chart showing a behavior of a thermal change occurred from time 1a to time 2;

FIG. 6(c) is a line chart showing a behavior of a thermal change occurred at and after time 0;

DETAILED DESCRIPTION OF PREFERRED EMBODIMENTS

Preferred embodiments of the invention about a thermal change computation apparatus will be described in detail with reference to the accompanying drawings. The following description will also refer to a thermal change correction method.

Figure 1:
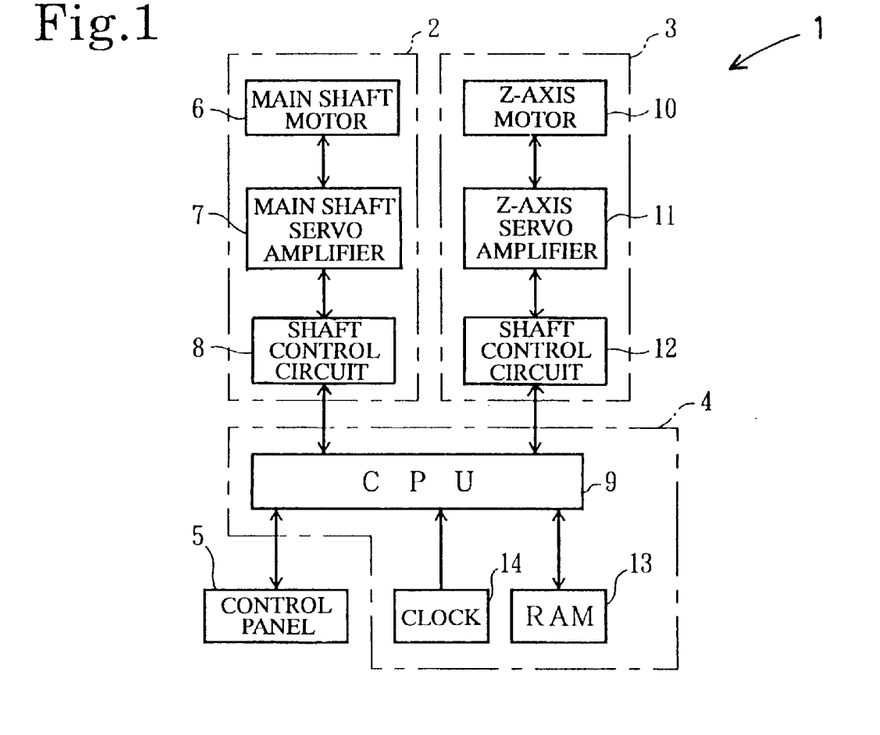
FIG. 1 is a control block diagram of a machine tool related to the invention.

As shown in FIG. 1, a control system of a machine tool 1 comprises a main shaft control system 2 for controlling the rotation of the main shaft, a Z-axis control system 3 for controlling the Z-axis position of the main shaft, a microcomputer 4 that operates as a brain of the control system, a control panel 5, an X-axis control system (not shown) for controlling the X-axis position of a table, a Y-axis control system (not shown) for controlling the Y-axis position of the table.

The main shaft control system 2 comprises a main shaft motor 6, a main shaft servo amplifier 7 for supplying an electric power to the main shaft motor 6, and a shaft control circuit 8 for controlling the manner in which the main shaft servo amplifier 7 supplies an electric power to the main shaft motor 6. The shaft control circuit 8 controls the operation of the main shaft servo amplifier 7 in accordance with an instruction from a CPU 9 in the microcomputer 4. The Z-axis control system 3 comprises a Z-axis motor 10, a Z-axis servo amplifier 11 for supplying an electric power to the Z-axis motor 10, and a shaft control circuit 12 for controlling the manner in which the Z-axis servo amplifier 11 supplies an electric power to the Z-axis motor 10. The shaft control circuit 12 controls the operation of the Z-axis servo amplifier 11 in accordance with an instruction from the CPU 9 in the microcomputer 4. Also, the X-axis control system and the Y-axis control system, not shown, comprise component similar to the main shaft control system 2 and the Z-axis control system 3.

The microcomputer 4 comprises a one-chip central processing unit (CPU) 9 having a read-only memory (ROM) that stores a control program, an input/output port (I/O port) built-in, a random-access memory (RAM) 13, and a clock 14. This microcomputer 4 (CPU 9) controls the main shaft control system 2 and the Z-axis control system 3 in accordance with the control program thereby to effect a designated machining operation on a workpiece. Also, the microcomputer 4 is connected to the control panel 5. Thus, the microcomputer 4 receives input signals from the control panel 5, sends signals to the control panel 5, and controls the display of an image, the display of characters on a liquid crystal display (LCD) of the control panel 5, and the blinking of a light emitting diode (LED).

The RAM 13 is used as a work area of the CPU 9, and backed up by a secondary battery. It stores data even if the power dispatching to the microcomputer 4 is off. Pitch error correction data is stored in the RAM 13. This pitch error correction data is used as a data table for correcting a driving error of a ball thread mechanism, for example.

The ball thread mechanism for the Z-axis movement cannot avoid an error between a rotation amount of the ball thread and a movement amount of the nut (i.e., Z-axis direction movement amount of the main shaft) due to a manufacturing tolerance, and hence such error has to be corrected. Therefore, there are set a proper number of correction points, e.g., 25 correction points if a length of the ball thread is 500 mm and a correction is executed at every 20 mm. An error between a computed value and an actual value of a movement amount obtained when the ball thread is rotated is measured at every correction point. A rotation amount (pitch) of the ball thread corresponding to that error is stored in the pitch error correction data table. The ball thread is rotated in the positive direction or in the opposite direction by the amount of the pitch at every correction point, thereby making the Z-axis position of the main shaft become accurate. This relationship applies to the X-axis and the Y-axis as well.

The clock 14 is an electronic clock including a so-called quartz crystal oscillator. It calculates a date and time by counting clock signals from the quartz crystal oscillator using a counter, and sends date and time data to the CPU 9. When the machine tool 1 is driven, a thermal change occurs in the Z-axis direction, for example, due to an expansion of the ball thread. Accordingly, the ROM in the CPU 9 stores a thermal change correction control program about a thermal change correction method and a thermal change computation apparatus.

Figure 2:
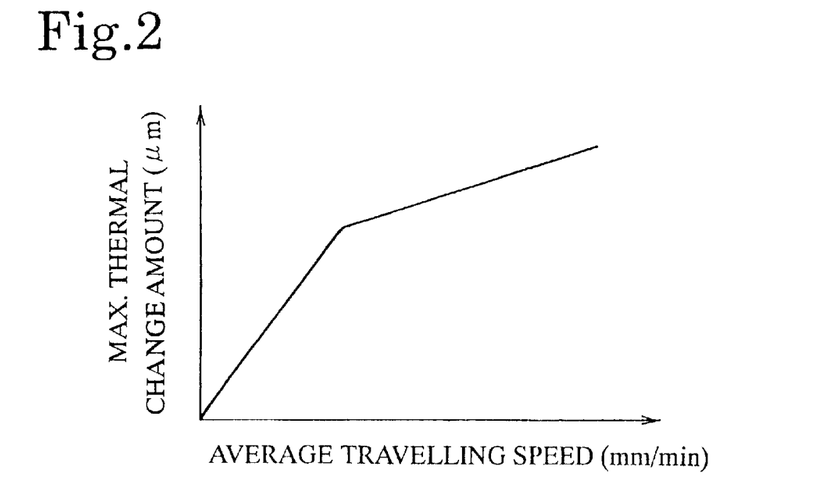
FIG. 2 is a line chart showing a characteristic of a maximum thermal change amount.

When the machine tool 1 is continuously driven and a temperature rises due to frictional heating, a heat-generated amount and a heat-radiated amount are placed in the equilibrium state. The amount of this thermal change is a saturated thermal change amount, that is a maximum thermal change amount. As shown in FIG. 2, the maximum thermal change amount is proportional to an average traveling distance per unit time of the main shaft (namely, the average traveling speed of the main shaft toward an axial direction). As the average traveling speed increases, the maximum thermal change amount also increases. This proportional relation is indicated by a line chart in which an inclination becomes gentle when the average traveling speed is at a designated value or more.

This characteristic results from the fact that, when the main shaft is moved at a high speed, a heat radiated amount increases owing to an air cooling effect to suppress a thermal change. The characteristic of the maximum thermal change amount shown in FIG. 2 depends on the types of the machine tool 1. After being manufactured, each type of the machine tool 1 is operated in various driving conditions to measure its thermal change to set in advance the characteristic of the maximum thermal change amount shown in FIG. 2, which will be stored in the RAM 13.

Figure 3:
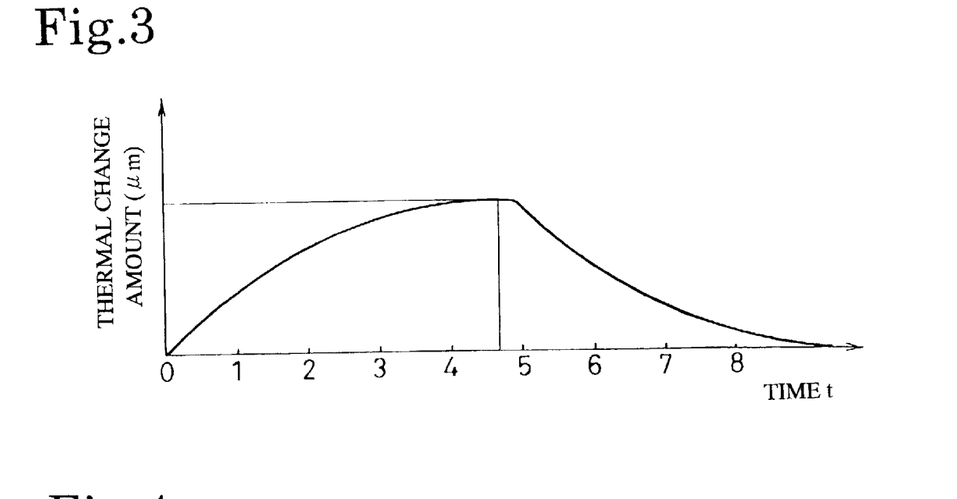
FIG. 3 is a line chart that shows an example of an increase-decrease characteristic of a thermal change amount.
Figure 4:
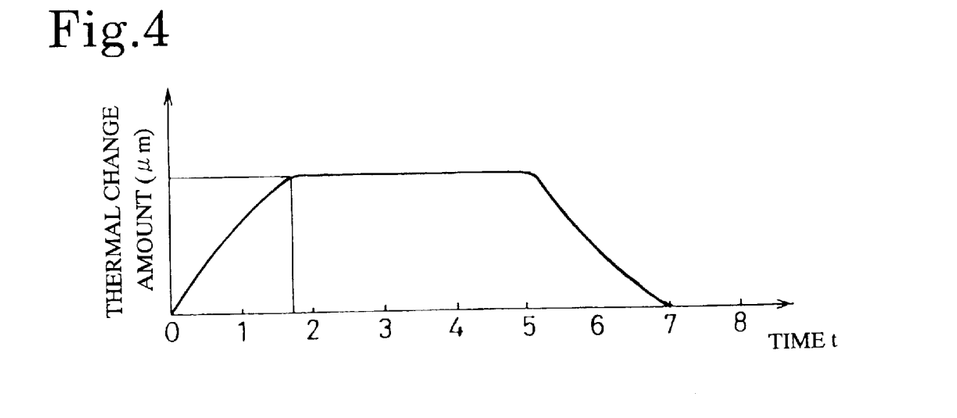
FIG. 4 is a line chart that shows an example of an increase-decrease characteristic of a thermal change amount.

FIG. 3 and FIG. 4 show the increase-decrease characteristic of the thermal change amount for the Z-axis drive system, for example, to be generated when the two types of the machine tool 1 are operated. In a large-sized machine tool with a large calorific capacity, the thermal change amount increases slowly to reach saturation as shown in FIG. 3. In a small-sized machine tool with a small calorific capacity, the thermal change amount increases sharply to reach saturation as shown in FIG. 4. The characteristic of the maximum thermal change amount depends on the types of the machine tool 1. After being manufactured, each type of the machine tool 1 is operated in various driving conditions to measure its thermal changes to set in advance the property of the maximum thermal change amount shown in FIG. 5, which will be stored in the RAM 13.

Figure 5:
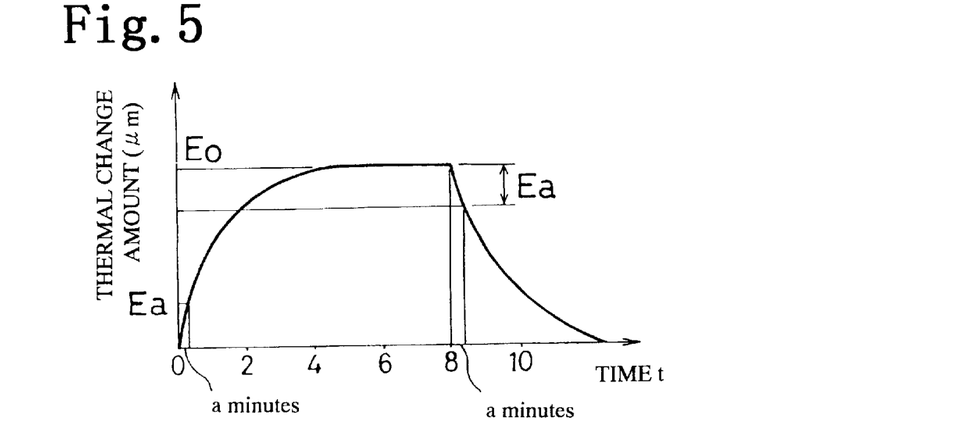
FIG. 5 is a line chart that shows an example of an increase-decrease characteristic of a thermal change amount.

The increase-decrease characteristic of the thermal change amount shown in FIG. 5 is similar to that shown in FIG. 3 and FIG. 4. in FIG. 5, where t represents time, E an thermal change amount at t, Eo a maximum thermal change amount in a certain driving condition, the thermal change amount varies as follows:
In the case where the thermal change amount increases $$E = E_o[1-\exp(-\gamma t)] \qquad (1)$$

In the case where the thermal change amount decreases $$E = E_o \times \exp(-\gamma t) \qquad (2)$$

where $\gamma$ represents a constant value inherent in each type of the machine tool 1, and units for t and E are hour and $\mu$m, respectively. From these formulas, thermal change amount Ea to be obtained at a-minutes after the machine tool 1 is started, is expressed as:

$$Ea = Eo[1-\exp(-\gamma \cdot a/60)].$$

Thermal change Ea to be obtained at a-minutes after the machine tool 1 is stopped from the maximum thermal change amount Eo, is expressed as:

$$Ea = Eo \times \exp(-\gamma \cdot a/60).$$

Figure 6:
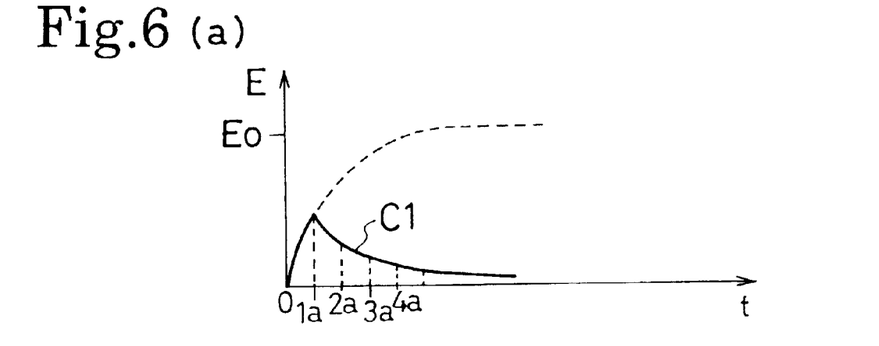

Next, the computation method for the thermal change amount of the machine tool 1 based on the characteristics indicated in FIG. 2 and FIG. 5 will now be explained referring to FIG. 6. As curve C1 in FIG. 6(a) indicates, supposing Eo represents a maximum thermal change amount based on an average traveling speed between time 0 and time 1a, thermal change amount E1a at time 1a which will be obtained from formula (1), is expressed as:

$$E1a = Eo[1-\exp(-\gamma \cdot a/60)]$$

Thermal change amount E2a at time 2a which will be obtained from formula (2), is expressed as:

$$E2a = E1 \times \exp(-\gamma \cdot a/60)$$

Similarly, thermal change amounts E3a and E4a at time 3a and 4a respectively will be obtained are respectively expressed as:

$$E3a = E1a \times \exp(-\gamma \cdot 2a/60)$$

$$E4a = E1a \times \exp(-\gamma \cdot 3a/60)$$

Similarly, supposing maximum change amount Eo1 is computed based on the average traveling speed between time 1a and time 2a, and a corresponding thermal change amount E is changed as shown by curve C2 in FIG. 6(b), thermal change amounts E2a, E3a, and E4a at time 2a, 3a, and 4a are respectively expressed as:

$$E2a = Eo1[1-\exp(-\gamma \cdot a/60)]$$

$$E3a = E2a \times \exp(-\gamma \cdot a/60)$$

$$E4a = E2a \times \exp(-\gamma \cdot 2a/60)$$

As described above, supposing that thermal change amounts E indicated with curves C3, C4, C5, C6, and C7 in FIG. 6(c) are computed based on that the Z-axis drive system is operated during sampling time at 1a, 2a, 3a, 4a, 5a, the total thermal change amount of thermal change amounts E in each case indicated with the above curves will vary as indicated with curve C8 in FIG. 6(c).

Next, a holding time where an influence of a thermal change amount remains will be explained.

As is understood from the decrease characteristic of the thermal change amount shown in FIG. 5, it is desirable that a holding time should be set to time t where $E = Eo \times \exp(-\gamma \cdot t) = 0$ in formula (2) is satisfied. However, a value of time t where $E = Eo \times \exp(-\gamma \cdot t) = 0$ can be satisfied becomes infinite, therefore the holding time is set to time Th where $E = Eo \times \exp(-\gamma \cdot t) = Eo \times \Delta$ is satisfied. ($\Delta$ is a designated very small number, e.g. 0.05.)

Using base natural logarithm e, the last formula can be further modified to be expressed according to the following formula:

$$\text{Holding time } t = -1/\gamma \cdot \ln \Delta$$

When $\Delta$ is 0.05, holding time t is a time until thermal change amount E decreases to 5% of maximum thermal change amount Eo.

Since thermal change amount E computed at each sampling time decreases as time elapses, it becomes possible to neglect an influence exerted upon the total thermal change amount obtained after the holding time has elapsed.

To set the holding time, the value for $E = Eo \times \exp(-\gamma \cdot t)$, is found from the increase-decrease characteristic of the thermal change amount shown in FIG. 5, time Th where $E = o \times \exp(-\gamma \cdot t) = Eo \times \Delta$) is satisfied, is computed to be set as the holding time, and stored in the RAM 13. If the designated value $\Delta$ is set to an excessively small number and the holding time is set to a rather longer time, the thermal change amount data is increased, thus the computation processing load becomes heavy and a greater memory to store the data is needed. If, on the other hand, the designated value $\Delta$ is set to an excessively great number and the holding time is set to a rather shorter time, the thermal change amount data is decreased but the computation accuracy of the thermal change amount is lowered. Therefore, the designated value A should be set properly.

For example, when the designated value $\Delta$ is 0.05 and g$\gamma$ is 1.2, the formula becomes In $^{0.05}/_{-3}$, therefore, holding time t is computed to be $t = -\frac{1}{1.2} \cdot (-3) = 2.5$.

In the increase characteristic of the thermal change amount increase-decrease characteristic, a time where E=0 is replaced by E=Eo may be set as a holding time. When the increase-decrease characteristic of the thermal change amount becomes like a shape as shown in FIG. 3, the holding time is set to about 5 hours for example, and when it becomes as shown in FIG. 4, the holding time is set to about 2 hours for example.

The CPU 9 makes the RAM 13 store thermal change amount E computed at each sampling time (within the holding time) along with the time when the computation is made. What the RAM 13 stores is kept even while the power is turned off Accordingly, when the power is turned off and then on again, the CPU 9 regards the traveling distance (and thermal change amount E) in the period while the power is turned off, as zero, and computes a total thermal change amount by adding up thermal change amounts computed while the power was previously on and the holding time is available.

The thermal change correction control will be now explained. The thermal change correction control comprises a characteristic setting control and a thermal change amount correction control. The characteristics setting control predetermines a characteristic of a maximum thermal change amount indicated in FIG. 2, which is found based on the thermal change amount data that is taken by operating the machine tool 1 in various driving conditions after it is completed; an increase-decrease characteristic of a thermal change amount indicated in FIG. 3; and a holding time which is to be found based on the characteristic indicated in FIG. 5 (in this embodiment, the holding time is inherent in the Z-axis control system). The thermal change amount correction control computes a thermal change amount while the machine tool 1 is in operation and corrects a control amount for the Z-axis control system based on the computed thermal change amount. The thermal change amount correction control will be now explained in detail referring to FIG. 7.

Figure 7:
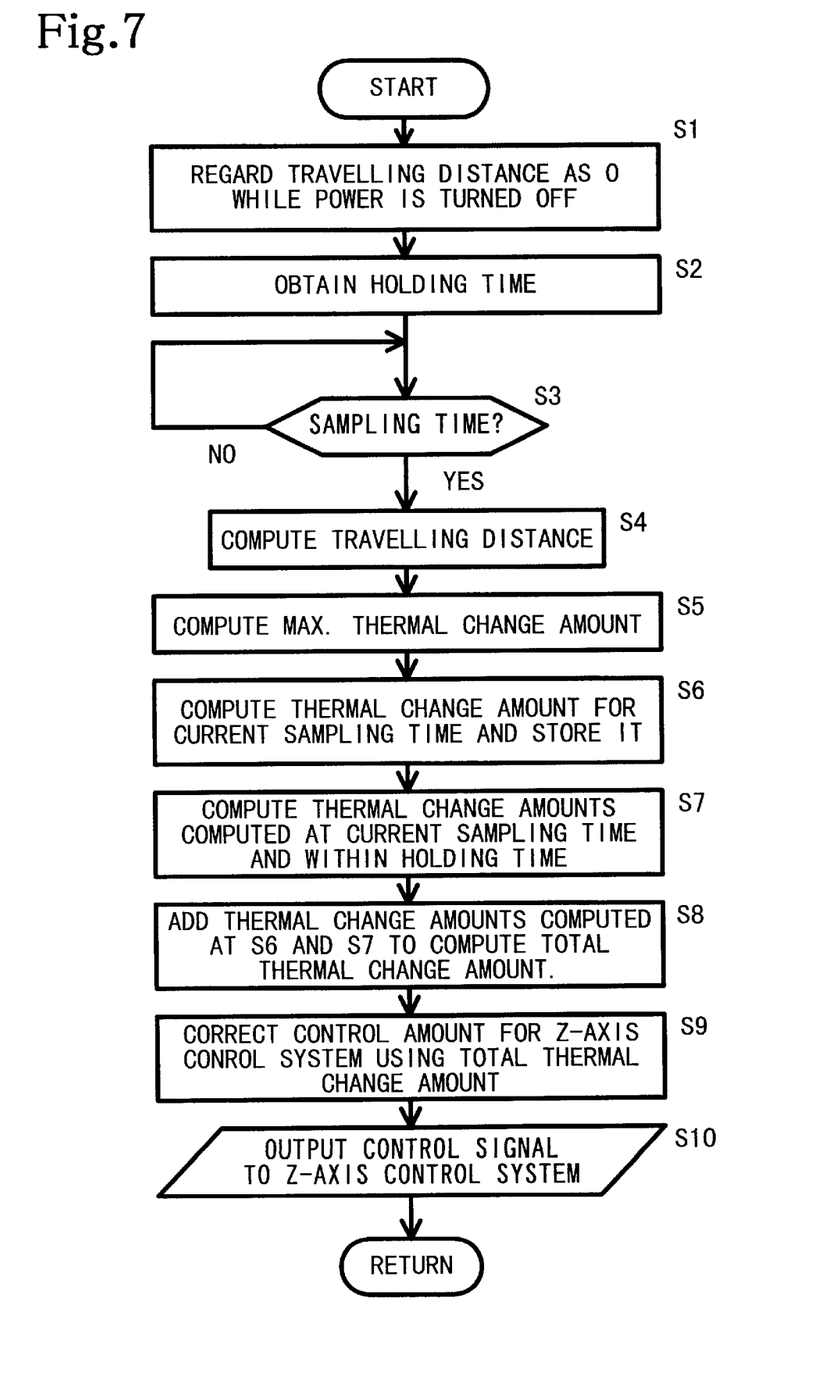
FIG. 7 is a flowchart showing how the thermal change amount correction is controlled.

In the flowchart shown in FIG. 7, Si (i=1, 2, . . .) stands for a procedure step for the thermal change amount correction control which is started when the power is turned on.

At the start, a traveling distance for the main shaft to move in the Z-axis direction while the power is turned off is regarded as 0 (S1) and the holding time is computed using the following formula (S2).

Holding time t=−1/γ•ln Δ where γ represents a value showing an increase-decrease characteristic of the thermal change amount that is inherent in the machine tool, and Δ a designated very small value.

Then, a deterioration on whether it is sampling time has arrived (S2), and if it is sampling time, the traveling distance for the main shaft to move in the Z-axis direction is computed based on the control amount of the Z-axis control system during sampling time from the previous sampling point and the current sampling point (S3).

A traveling speed is computed based on the traveling distance computed at S3 and the sampling period, and a maximum thermal change amount is computed by applying the traveling speed to the maximum thermal change amount characteristic indicated in FIG. 2 (S4). The maximum thermal change amount and the sampling time from the previous sampling point to the current sampling point are applied to the increase-decrease characteristic shown in FIG. 5, that is, formula (1), and consequently the thermal change amount for the current sampling time is computed and stored in the RAM 13 (S5). Of thermal change amount data computed at each sampling point in the past, the thermal change amounts computed within the holding time are read out from the RAM 13, and thermal change amounts at the current sampling time are computed respectively (S6).

A total thermal change amount is computed by adding thermal change amounts computed at S5 and S6 (S7). Using the total thermal change amount, the control amount for the Z-axis control system is corrected so as to eliminate errors due to thermal change (S8). A control signal corresponding to the corrected control amount is output to the Z-axis control system (S9). After that, it returns to S2. Once the power is turned off, the procedure is finished.

Since the control amount for the Z-axis control system is corrected at each sampling time, the sampling period should be set to a small value.

As mentioned above, based on the thermal change data taken according to a type of the machine tool 1, the maximum thermal change amount characteristic shown in FIG. 2, the increase-decrease characteristic of the thermal change amount shown in FIG. 5, and the holding time in which an influence of a thermal change remains are all set in advance and stored in the RAM 13. While the machine tool 1 is in operation, the characteristics and the holding time are used to properly compute a thermal change amount in the Z-axis control system, and using the computed thermal change amount, the control amount of the Z-axis control system can be corrected so as to eliminate any error due to the thermal change amount.

Since the holding time to be set is not the one common to plural machine tools, but the one found from the increase-decrease characteristic of the thermal change amount that is found from the thermal change measurement data taken according to a type of the machine tool, all data regarding the thermal change amounts computed in the past are memorized as they are, and it is possible to compute an accurate thermal change amount.

As a result, it becomes possible to prevent multiplication of the computation load of the thermal change amount for nothing and the expansion of the memory to store the thermal change amount data to no purpose. Moreover, data regarding the thermal change amounts computed in the past are not running short, and the accuracy to compute a thermal change amount will not be lowered. When the thermal conditions of the machine tool 1 have been changed due to the design change, it is desirable that a thermal amount increase-decrease characteristic and a holding time should be newly obtained from the latest thermal change data taken by measuring thermal changes again.

Figure 8:
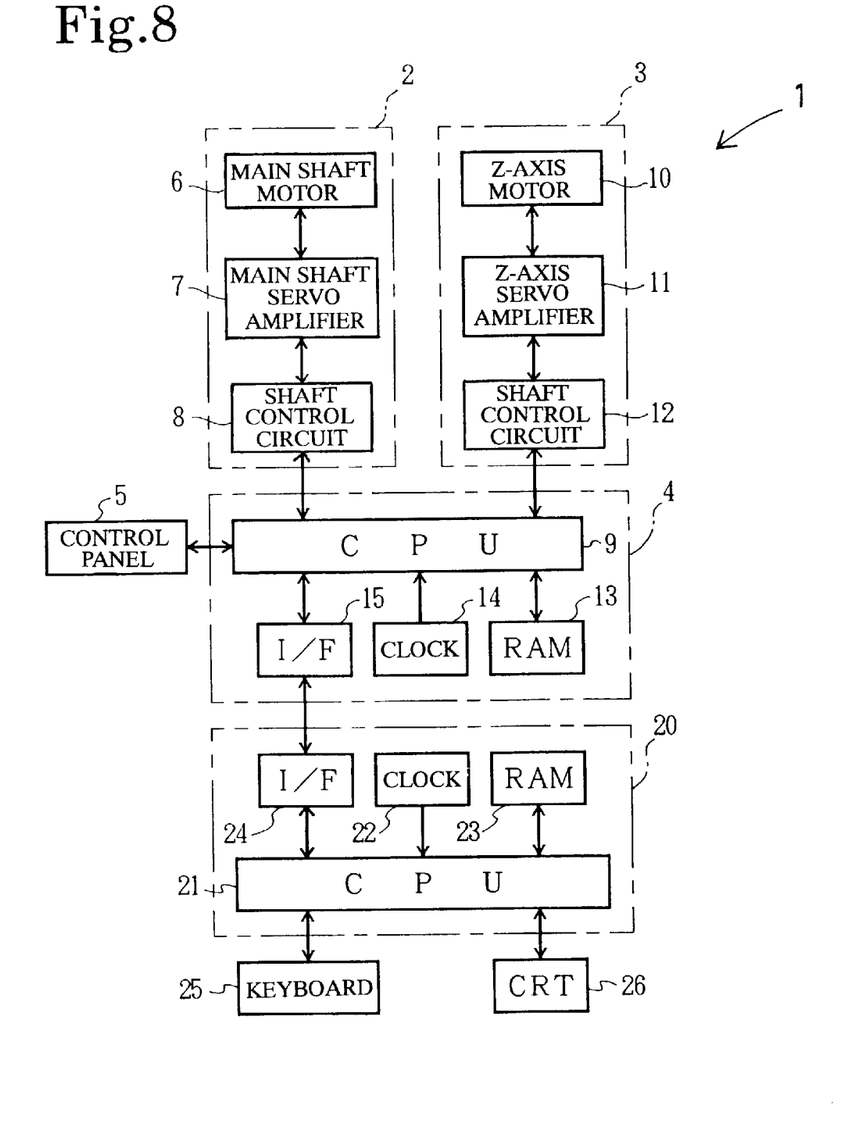
FIG. 8 is a control block diagram related to the modified embodiment of the invention.

Another embodiment that partly modifies the above embodiment will be explained. As shown in FIG. 8, the microcomputer 4 has an interface (I/F) 15 in addition to the above-mentioned parts. It is connected to a personal computer 20 through the interface 15. The personal computer 20 comprises a one-chip CPU 21 housing the ROM that stores a control program and an input/output port, a clock 22, a RAM 23, and an interface 24 which is connected to the microcomputer 4. A keyboard 25 and a CRT 26 are connected to the personal computer 20.

In the control system, the microcomputer 4 controls the operation of the machine tool 1 based on the machining program, and sends the data required to compute a total thermal change amount, such as a traveling distance of the main shaft, to the personal computer 20. The personal computer 20 computes a thermal change amount, which is later described, and sends the computed thermal change amount to the microcomputer 4. The microcomputer 4 executes the machining program while correcting the control amount of the Z-axis control system to eliminate any errors due to thermal change amount based on the sent thermal change amount.

Figure 9:
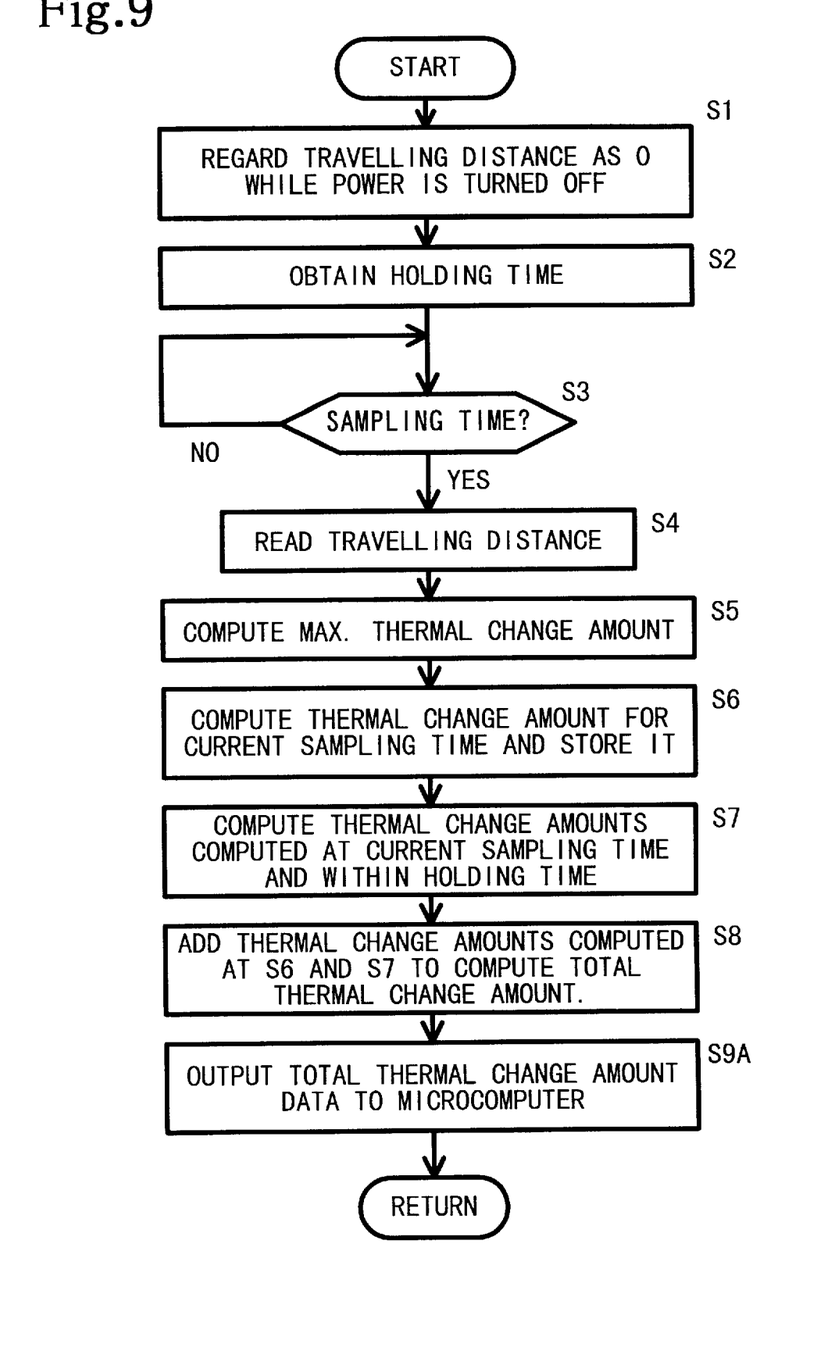
FIG. 9 is a flowchart showing how the thermal change amount correction is controlled on the control system indicated in FIG. 8.

The CPU 21 monitors the condition of the power of the machine tool 1. It repeats processes indicated in FIG. 9 every designated very short time when the power of the machine tool 1 is turned on. Steps S1–S2 and S4–S7 in the flowchart of FIG. 9 are the same as those of FIG. 7. At S3A, the data of the traveling distance computed in the microcomputer 4 is read, and processes on and after S4 are implemented based on the data. At S8A, the data of the total thermal change amount is outputted to the microcomputer 4, and then the same processes as S8 and S9 of FIG. 7 are implemented in the microcomputer 4.

In this embodiment, the same operation and effects as the previous embodiment can be obtained. The CPU 21 stores thermal change amount data in the RAM 23 also in this embodiment, but it is not necessary to make a backup of the data. This is because the storage content does not disappear as long as the power of the personal computer 20 is kept on, even if the power of the machine tool 1 is turned off. In this embodiment, if the personal computer 20 is connected to several machine tools via the interface 24, it is possible to compute a thermal change amount of each machine tool on the personal computer 20 only. The maximum thermal change characteristic, the increase-decrease characteristic of the thermal change amount, and the holding time, all to be applied, should be inherent in a type of the machine tool 1.

Figure 10:
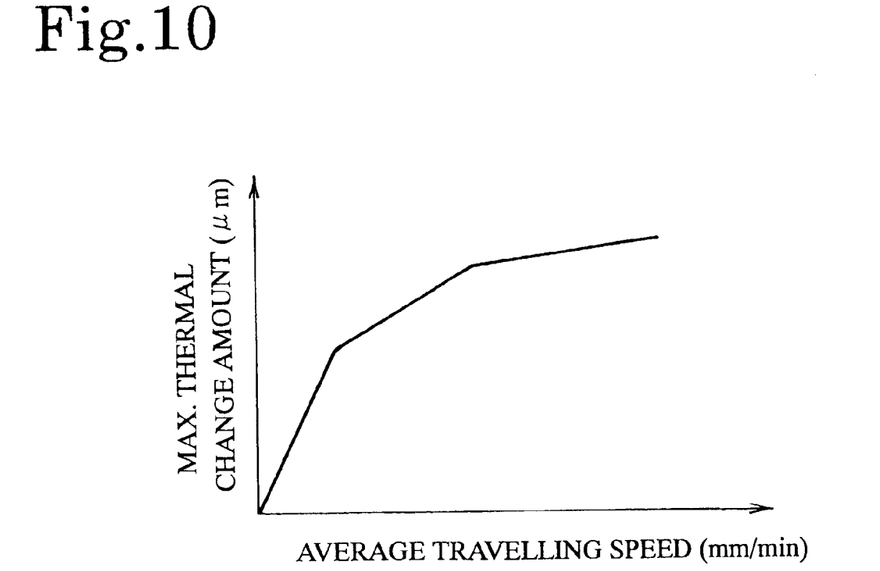
FIG. 10 corresponds to FIG. 2 in the case of the modified embodiment.
Figure 11:
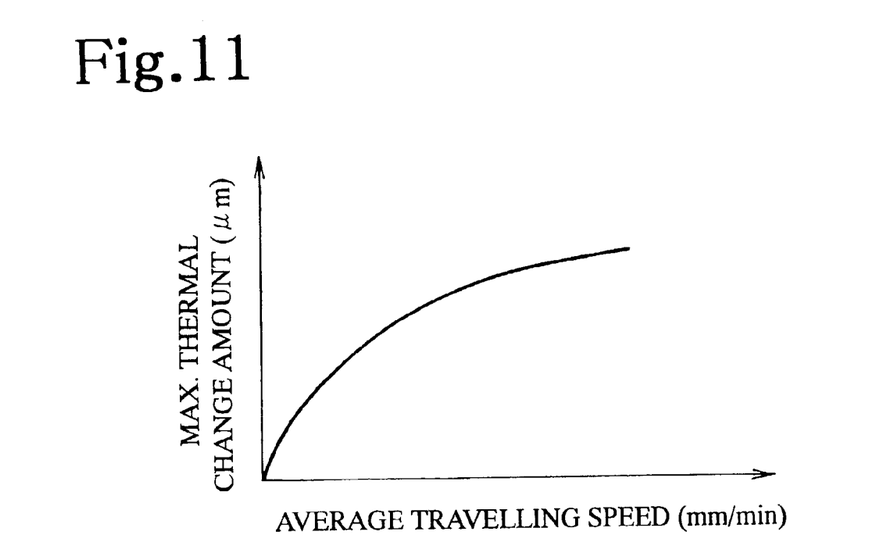
FIG. 11 corresponds to FIG. 2 in the case of the modified embodiment.

A graph showing the characteristic of the maximum thermal change amount is not limited to FIG. 2. It may be expressed as a line chart with three or more inclinations like FIG. 10, and a non-linear chart like FIG. 11.

At S8 in FIG. 7, the control amount of the Z-axis control system is always corrected based on the total thermal change amount, but it may be corrected only when the total thermal change amount is at a designated value or more.

Figure 12:
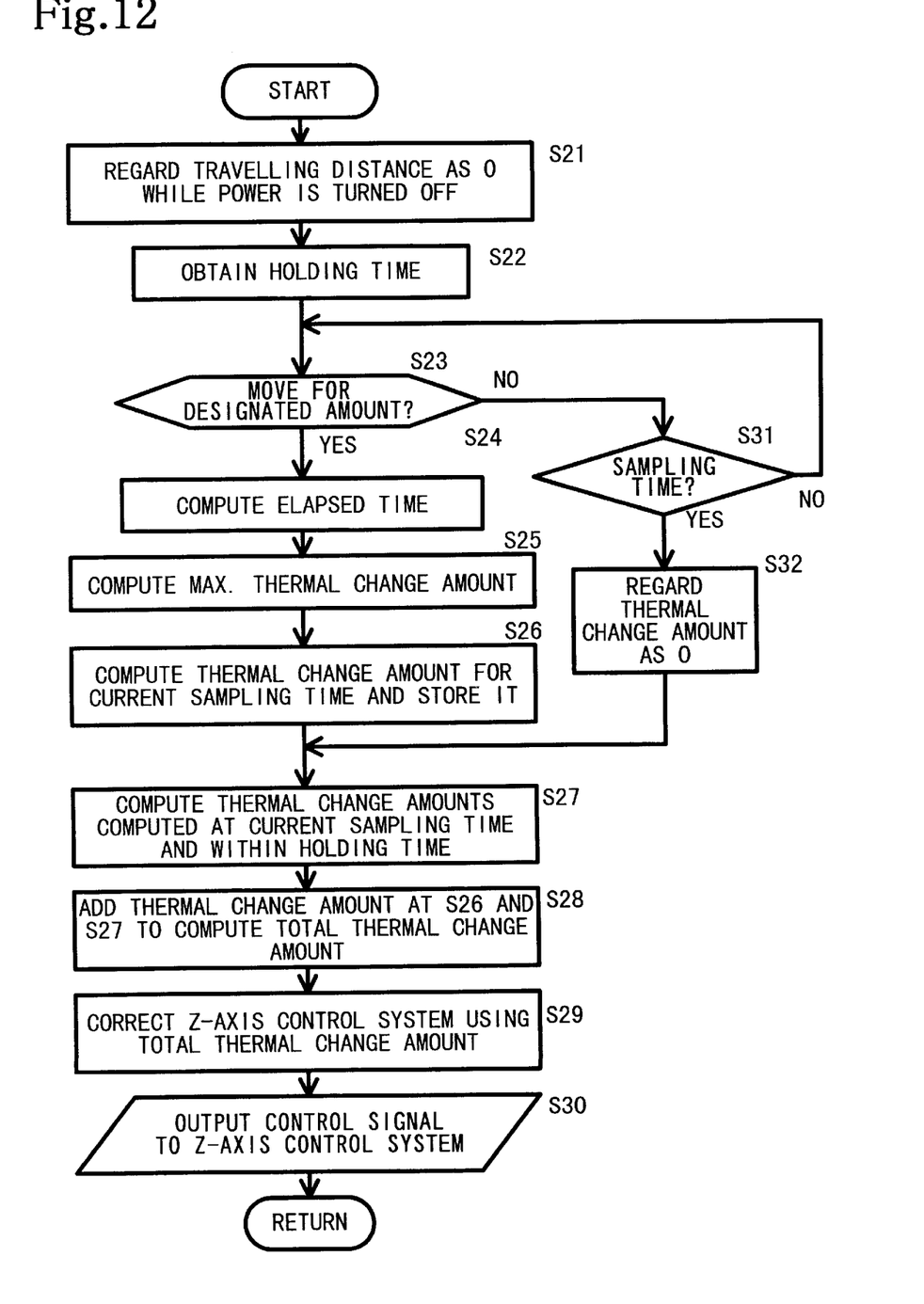
FIG. 12 is a flowchart showing how the thermal change amount correction is controlled in the case of the modified embodiment.

In the above-mentioned embodiments, a thermal change amount is computed at every designated time (sampling period), but it may be computed every time the machine tool 1 is operated for a designated amount. In this case, processes like those indicated in the flowchart of FIG. 12 may be implemented. When control is started with the application of the power of the machine tool 1, S21 is implemented in the same manner with S1 in FIG. 7, and holding time t is computed using the following formula:

Holding time $t = -1/\gamma \cdot \ln \Delta$ where $\gamma$ represents a value showing an increase-decrease characteristic of the thermal change amount and that is inherent in the machine tool, and $\Delta$ a designated very small value.

The driving status of the machine tool 1 is detected to make a judgment on whether the main shaft has been moved for a designated amount or not (S22).

When the judgment is "Yes", an elapsed time from the previous computation processing to the current one is computed (S23), and the traveling speed which is computed based on the designated movement amount and elapsed time is applied to the maximum thermal change amount indicated in FIG. 2, to compute the maximum thermal change amount at the average driving speed (S24). Then processes S25–S29 are implemented in this order in the same manner with S5–S9 in FIG. 7.

When the judgment is "No" at S22, a judgment on whether it is in the sampling time or not is made at S30. If the judgment is "No", it returns to S22, and if it is into the sampling time, the thermal change amount is regarded as zero at S31, and it goes to S26.

In the above-mentioned embodiments, the horizontal axis in the graph indicated in the FIG. 2 represents the parameters of the traveling speed of the main shaft that is operated by the Z-axis control system. The characteristic of the maximum thermal change amount indicated in FIG. 2 may be expressed by regarding the rotation amount of the main shaft motor as the parameters on the horizontal axis.

Otherwise, it may be possible to compute the total thermal change amount in the Z-axis direction by adding a thermal change amount computed based on the rotation amount of the main shaft to the total thermal change amount computed as above-mentioned. In this case, more appropriate thermal change amount in the Z-axis direction can be obtained.

In the above-mentioned embodiments, thermal change computation apparatus computes a holding time using mathematical formulas including the increase-decrease characteristic $\gamma$ and the designated small value $\Delta$, however, if it is used for a machining tool alone, holding time inherent to the machining tool, which is computed in advance may be stored in the ROM.

Figure 15:
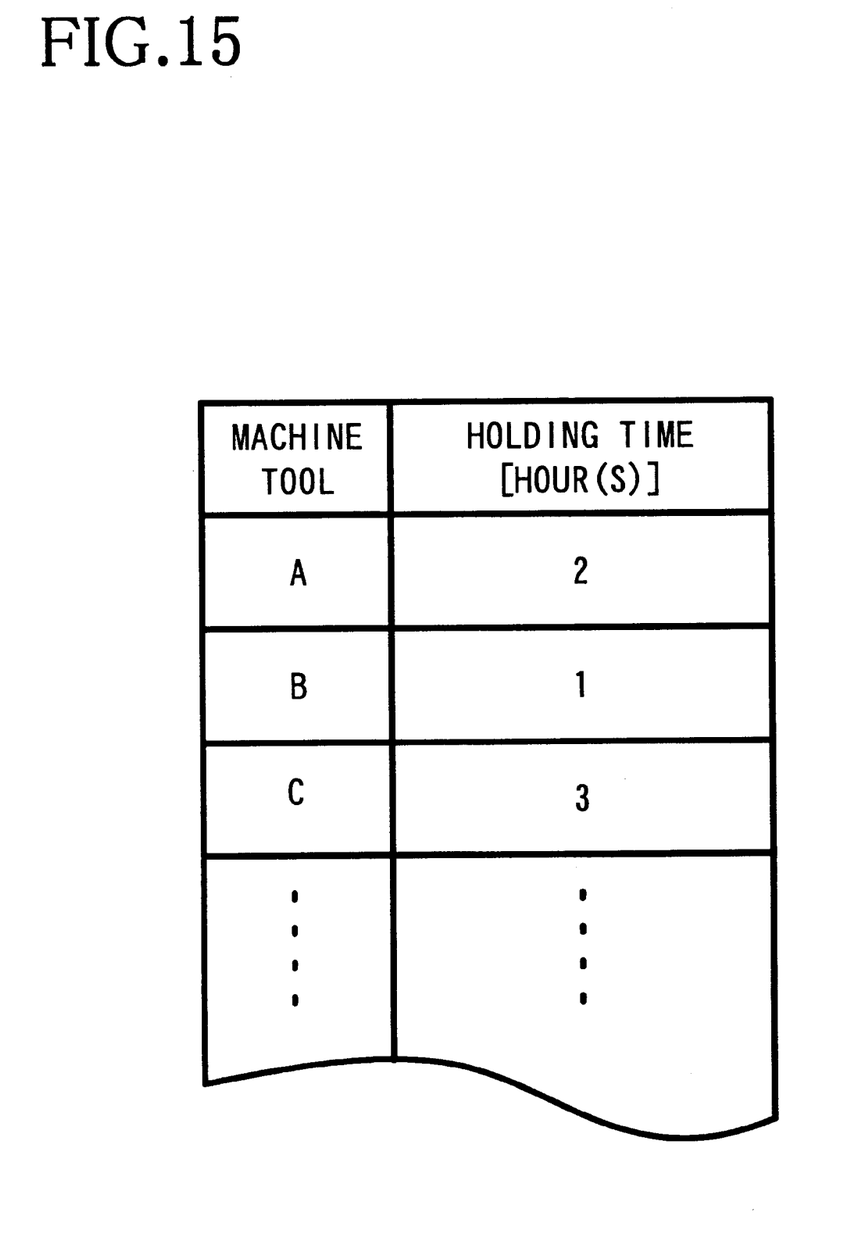
FIG. 15 is an exemplary table containing holding times for various machine tools.

On the other hand, if the apparatus is used in common with a plurality of machine tools, a table where holding times inherent in each of machine tools are associated with respective machine tools may be stored in advance in the ROM as shown in FIG. 15, so that holding time for a type of machine tool to be used can be read out from the ROM.

Further, a holding time input by an operator from the control panel 104 may be stored in the RAM 23. In this case, there is no need to store a program that computes holding time or a table corresponding each type of machining tools and its holding time in the ROM.

What is claimed is:

1. A thermal change computation apparatus for use with a machine tool including a machining mechanism for machining a workpiece and a driving mechanism for changing a relative position between the machining mechanism and the workpiece, the apparatus comprising:

a driving state of the driving mechanism detecting unit that detects a driving state of the machine tool;

a change amount computing unit that computes a thermal change amount of the machine tool based on the driving state detected at every designated operation; and a change amount adding unit that computes a present thermal change amount of the machine tool by adding the influence of the thermal change amount previously computed to a newly computed thermal change amount, and computes the present thermal change amount of the machine tool when the previously computed thermal change amount is available and a holding time for an influence of a thermal change inherent in the machine tool does not elapse.

2. The thermal change computation apparatus according to claim 1, further comprising:

a holding time computing unit that computes the holding time for an influence of a thermal change of the machine tool.

3. The thermal change computation apparatus according to claim 2, wherein the holding time computing unit computes the holding time based in an increase-decrease characteristic of the thermal change amount in the machine tool.

4. The thermal change computation apparatus according to claim 3, wherein the holding time computing unit computes holding time t using the following formula:

$$t = -1/\gamma \cdot \ln \Delta$$

where $\gamma$ represents a value showing an increase-decrease characteristic of the thermal change amount and that is inherent in the machine tool, and $\Delta$ a designated very small value.

5. The thermal change computation apparatus according to claim 1, further comprising:
  a holding time memory that stores computes the holding time for an influence of a thermal change that is inherent in the machine tool.

6. The thermal change computation apparatus according to claim 5, further comprising:
  a holding time setting unit that sets the holding time inherent in the machine tool.

7. The thermal change computation apparatus according to claim 5, wherein the holding time memory stores holding times inherent in each respective machine tool.

8. A thermal change amount computation method for use with a machine tool including a machining mechanism for machining a workpiece and a driving mechanism for changing a relative position between the machining mechanism and the workpiece, the means comprising the steps of:
  detecting a driving status of the driving mechanism of the machine tool;
  computing a thermal change amount of the machine tool based on the driving state detected at every designated operation; and
  computing a present thermal change amount of the machine tool by adding an influence of a thermal change amount previously computed to a newly computed thermal change amount, and computing the present thermal change amount of the machine tool when the previously computed thermal change amount is available and a holding time for an influence of a thermal change inherent in the machine tool does not elapse.

9. The thermal change computation method according to claim 8, further comprising:
  computing the holding time for an influence of a thermal change of the machine tool.

10. The thermal change computation method according to claim 9, wherein the holding time computing step computes the holding time based in an increase-decrease characteristic of the thermal change amount in the machine tool.

11. The thermal change amount computation method according to claim 10, wherein holding time t is computed using the following formula:

$$t = -1/\gamma \cdot \ln \Delta$$

where $\gamma$ represents a value showing an increase-decrease characteristic of the thermal change amount and that is inherent in the machine tool, and $\Delta$ a designated very small value.

12. The thermal change computation method according to claim 8, further comprising:
  storing the holding time that is inherent in the machine tool in a holding time memory.

13. The thermal change computation method according to claim 12, further comprising:
  setting the holding time inherent in the machine tool.

14. The thermal change computation method according to claim 12, wherein the storing step stores holding times inherent in each respective machine tool in the holding time memory.

15. A storage medium that stores a thermal change computation programs for use with a machine tool including a machining mechanism for machining a workpiece and a driving mechanism for changing a relative position between the machining mechanism and the workpiece, said storage medium comprising:
  a program that detects a driving state of the driving mechanism of the machine tool;
  a program that computes a thermal change amount of the machine tool based on the driving state of the machine tool detected at every designated operation; and
  a program that computes a present thermal change amount of the machine tool by adding an influence of a thermal change amount previously computed to a newly computed thermal change amount, and computes the present thermal change amount of the machine tool when the previously computed thermal change amount is available and a holding time for an influence of a thermal change inherent in the machine tool does not elapse.

16. The storage medium that stores thermal change computation programs according to claim 15, further comprising:
  a program that computes the holding time for an influence of a thermal change of the machine tool.

17. The storage medium that stores thermal change computation programs according to claim 16, wherein the program for computing a holding time computes the holding time based in an increase-decrease characteristic of the thermal change amount in the machine tool.

18. The storage medium that stores a thermal change computation programs according to claim 17, wherein the program that computes a holding time uses the following formula to compute holding time t:

$$t = -1/\gamma \cdot \ln \Delta$$

where $\gamma$ represents a value showing an increase-decrease characteristic of the thermal change amount and that is inherent in the machine tool, and $\Delta$ a designated very small value.

19. The storage medium that stores a thermal change computation programs according to claim 15, further comprising:
  a program for storing the holding time that is inherent in the machine tool in a holding time memory.

20. The storage medium that stores a thermal change computation programs according to claim 19, further comprising:
  a program for setting the holding time inherent in the machine tool.

21. The storage medium that stores a thermal change computation programs according to claim 19, wherein the program for storing stores holding times inherent for each respective machine tool in the holding time memory.

* * * * *